US010898977B2

(12) United States Patent
Lim

(10) Patent No.: US 10,898,977 B2
(45) Date of Patent: Jan. 26, 2021

(54) ADDING CUTTING STATIONS TO BENDING SYSTEMS

(71) Applicant: Seoul Laser Dieboard System Co., Ltd., Lake Forest, CA (US)

(72) Inventor: Kyong Chan Lim, San Diego, CA (US)

(73) Assignee: SEOUL LASER DIEBOARD SYSTEM CO., LTD., Lake Forest, CA (US)

(*) Notice: Subject to any disclaimer, the term of this patent is extended or adjusted under 35 U.S.C. 154(b) by 422 days.

(21) Appl. No.: 15/906,985

(22) Filed: Feb. 27, 2018

(65) Prior Publication Data

US 2018/0244011 A1 Aug. 30, 2018

Related U.S. Application Data

(60) Provisional application No. 62/464,237, filed on Feb. 27, 2017.

(51) Int. Cl.
*B23P 15/40* (2006.01)
*B23P 15/24* (2006.01)
(Continued)

(52) U.S. Cl.
CPC ........... *B23P 15/406* (2013.01); *B21D 5/004* (2013.01); *B23D 33/006* (2013.01); *B23P 21/00* (2013.01);
(Continued)

(58) Field of Classification Search
CPC ....................... B23P 15/24; B23P 15/28; B23P 15/40–15/406; B26F 2001/4463; Y10T 29/5142–5145; Y10T 29/5197–5198; Y10T 29/53313; Y10T 83/169; Y10T 83/4455; Y10T 83/4659; Y10T 83/4662; B23D 33/006; B23D 36/0033; Y10S 83/949; B65H 35/006; B65H 35/0066; B65H 35/06; B65H 35/0093
(Continued)

(56) References Cited

U.S. PATENT DOCUMENTS 4,341,008 A * 7/1982 Graboyes ............. B23P 15/406
29/423
4,562,754 A * 1/1986 Archer ................. B21D 37/205
76/107.8
(Continued)

FOREIGN PATENT DOCUMENTS

JP 08-243834 A * 9/1996

*Primary Examiner* — Erica E Cadugan
(74) *Attorney, Agent, or Firm* — Procopio, Cory, Hargreaves & Savitch LLP

(57) ABSTRACT

A system for generating rules inserted into at least one pattern board including: a controller configured to generate at least one shape diagram, the controller also configured to determine number and measurement of crease rules to be generated based on the at least one shape diagram; a cutting station configured to receive and cut a first crease rule into the number and measurement of the crease rules; and a sorter configured to receive the crease rules from the cutting station and sort the crease rules according to the measurement of the crease rules, wherein the sorted crease rules are inserted into each of the at least one pattern board along with a cutting rule shaped by each of at least one bender.

7 Claims, 5 Drawing Sheets

(51) Int. Cl.
    *B21D 5/00*         (2006.01)
    *B65H 35/06*       (2006.01)
    *B23P 21/00*       (2006.01)
    *B23D 33/00*       (2006.01)
    *B65H 35/00*       (2006.01)
    *B31D 1/00*         (2017.01)
    *B26D 3/08*         (2006.01)
    *B31B 50/20*       (2017.01)
    *B31B 50/25*       (2017.01)
    *B26F 1/44*         (2006.01)
    *B31B 50/14*       (2017.01)
    *B31B 100/00*     (2017.01)

(52) U.S. Cl.
    CPC ......... B65H 35/0066 (2013.01); B65H 35/06 (2013.01); *B26D 3/085* (2013.01); *B26F 1/44* (2013.01); *B26F 2001/4463* (2013.01); *B31B 50/142* (2017.08); *B31B 50/20* (2017.08); *B31B 50/252* (2017.08); *B31B 2100/00* (2017.08); *B31D 1/0043* (2013.01); *B65H 35/008* (2013.01); *B65H 35/0093* (2013.01); *Y10T 29/5143* (2015.01); *Y10T 29/5145* (2015.01); *Y10T 29/5197* (2015.01); *Y10T 29/53313* (2015.01); *Y10T 83/169* (2015.04)

(58) Field of Classification Search
    USPC .......... 76/107.8, 107.1, 4; 72/294, 306–307; 29/564.6–564.8, 33 Q, 33 S, 771; 83/949, 83/76.4, 208, 287–288
    See application file for complete search history.

(56) References Cited

U.S. PATENT DOCUMENTS

| | | | | |
|---|---|---|---|---|
| 4,737,904 | A * | 4/1988 | Ominato | B23D 33/006 226/28 |
| 5,461,893 | A * | 10/1995 | Tyler | B21D 5/042 72/10.1 |
| 5,537,895 | A * | 7/1996 | Young | B21D 7/06 72/166 |
| 5,771,725 | A * | 6/1998 | Mizukawa | B21D 5/045 72/17.3 |
| 5,787,750 | A * | 8/1998 | Song | B21D 7/022 72/294 |
| 6,367,302 | B1 * | 4/2002 | Park | B21D 11/10 72/294 |
| 7,882,720 | B2 * | 2/2011 | Mizukawa | B21D 37/205 72/307 |
| 2001/0017074 | A1 * | 8/2001 | Yamada | B21D 53/64 83/697 |
| 2004/0255741 | A1 * | 12/2004 | Deng | B23P 15/406 83/13 |
| 2018/0236683 | A1 * | 8/2018 | Lim | B26F 1/40 |

* cited by examiner

ADDING CUTTING STATIONS TO BENDING SYSTEMS

CROSS-REFERENCE TO RELATED APPLICATIONS

This application claims the benefit of priority under 35 U.S.C. § 119(e) of U.S. Provisional Patent Application No. 62/464,237, filed Feb. 27, 2017, entitled "Adding Cutting Station to Bending System." The disclosure of the above-referenced application is incorporated herein by reference.

BACKGROUND

Technological Field

The present disclosure relates to cutting stations, and more specifically, to adding cutting stations to a bending system to generate rules inserted into the pattern board.

Background

Generally, a rule bent into a cutting blade or crease rule is attached to a pattern board for use in pressing a folding or cutting line on plate matters such as paper, canvas, leather, plastic, etc. The plate matters with such pressed folding and/or cutting lines (i.e., the pressed lines) can be used in a folded shape like a box (e.g., a pizza box), card (e.g., a greeting card), or other similar items. Accordingly, in order to assemble the plate matter into a predetermined shape with the cutting blade or crease rule, it is necessary to process and/or fold the rule into shapes suitable for forming the pressed lines.

SUMMARY

This disclosure describes systems for generating rules inserted into at least one pattern board.

In one implementation, a system for generating rules inserted into at least one pattern board is disclosed. The system includes: a controller configured to generate at least one shape diagram, the controller also configured to determine number and measurement of crease rules to be generated based on the at least one shape diagram; a cutting station configured to receive and cut a first crease rule into the number and measurement of the crease rules; and a sorter configured to receive the crease rules from the cutting station and sort the crease rules according to the measurement of the crease rules, wherein the sorted crease rules are inserted into each of the at least one pattern board along with a cutting rule shaped by each of at least one bender.

In another implementation, a system for generating rules inserted into a plurality of pattern boards is disclosed. The system includes: a cutting station configured to receive a plurality of shape diagrams from a plurality of benders, the cutting station also configured to determine number and measurement of a plurality of crease rules to be generated for each of the plurality of shape diagrams, the cutting station further configured to cut a first crease rule into the number and measurement of the plurality of crease rules; and a sorter configured to receive the plurality of crease rules from the cutting station and sort the plurality of crease rules according to the measurement of the crease rules for each of the plurality of pattern boards, wherein the sorted crease rules are inserted into each of the plurality of pattern boards along with a cutting rule shaped by each of the plurality of benders.

In yet another implementation, a system for generating rules inserted into a plurality of pattern boards is disclosed. The system includes: a plurality of cutting stations configured to generate a shape diagram and determine number and measurement of a plurality of crease rules to be generated for the shape diagram, a first cutting station of the plurality of cutting stations is configured to cut at least one of the plurality of crease rules according to a first type of measurement of the plurality of crease rules, a second cutting station of the plurality of cutting stations is configured to cut at least one of the plurality of crease rules according to a second type of measurement of the plurality of crease rules; and at least one sorter configured to receive the plurality of crease rules from the plurality of cutting stations, the at least one sorter configured to sort the plurality of crease rules according to both the first type and the second type of the measurement of the plurality of crease rules for each of the plurality of pattern boards, wherein the sorted crease rules are inserted into each of the plurality of pattern boards along with a cutting rule shaped by each of a plurality of benders.

Other features and advantages of the present disclosure should be apparent from the following description which illustrates, by way of example, aspects of the disclosure.

BRIEF DESCRIPTION OF THE DRAWINGS

The details of the present disclosure, both as to its structure and operation, may be gleaned in part by study of the accompanying drawings.

DETAILED DESCRIPTION

Figure 1A:
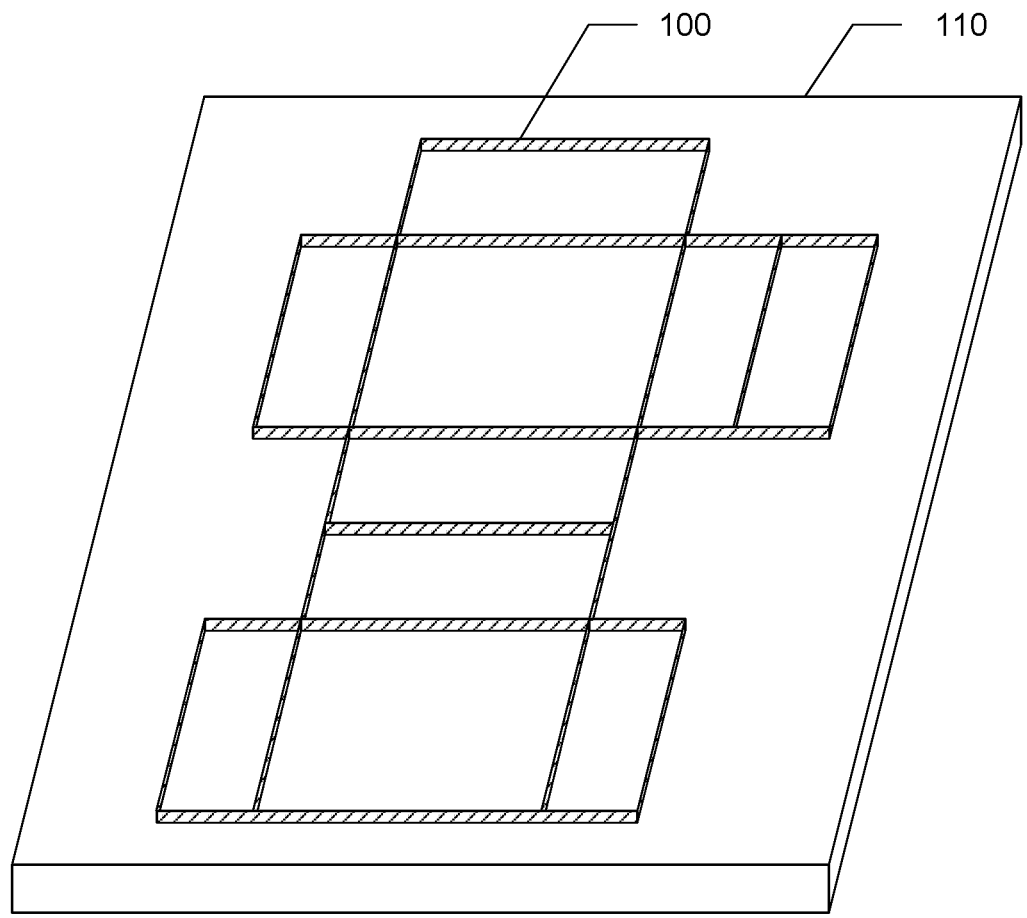
FIG. 1A shows one example of a rule attached to a pattern board.

The present disclosure describes at least one cutting system used in conjunction with a set of benders and a controller to obviate the issue with a cumbersome process of re-programming the bender and switching out the heavy roll of cutting rule(s) with the heavy roll of crease rule(s). The detailed description set forth below, in connection with the accompanying drawings, is intended as a description of various implementations and is not intended to represent the only implementations in which the disclosure may be practiced. The detailed description includes specific details for the purpose of providing a thorough understanding of the implementations. In some instances, well-known structures and components are shown in simplified form for brevity of description. As used herein, like reference numerals refer to like features throughout the written description.

FIG. 1A shows one example of a rule 100 attached to a pattern board 110 (often referred to as a die-board). As shown, the rule 100 of FIG. 1A is folded and cut in a shape suitable for forming the pressed line in the predetermined shape. However, prior to attaching the rule 100 to the pattern board 110, the rule 100 needs to be prepared by folding and/or cutting so that the prepared rule 100 attaches to the pattern board 110 and is able to cut and/or press the plate matter properly.

Figure 1B:
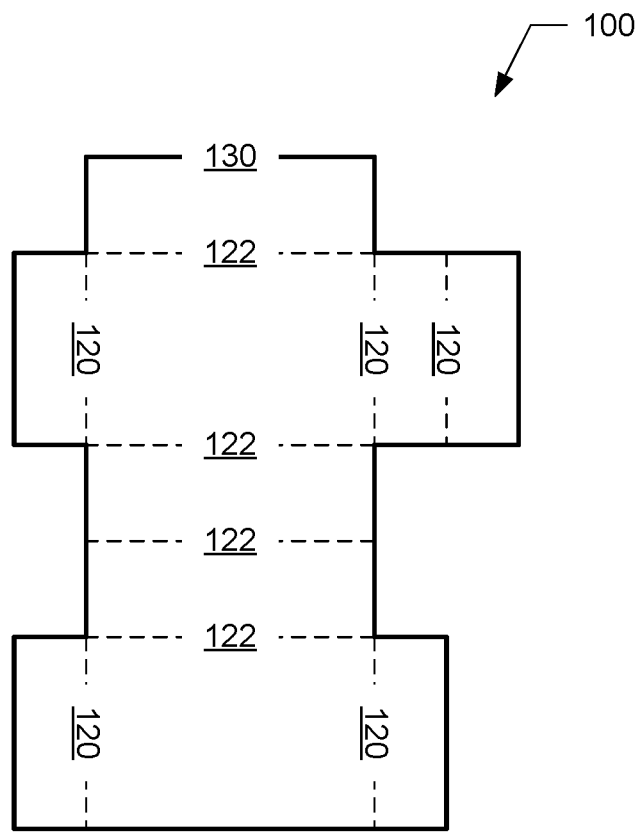
FIG. 1B shows a top view of the rule without the pattern board.

FIG. 1B shows a top view of the rule 100 without the die-board 110. The example of FIG. 1B shows the rule 100 with a bold line for a cutting rule 130 and dotted lines for crease rules 120, 122 (the dotted lines may represent perforations made using mixed cut-crease rules). That is, when the rule 100 is inserted into the die-board 110 and is used to press on a plate matter, the cutting rule 130 cuts the plate matter, while the crease rules 120, 122 form creases or perforations for bending.

Generally, a bender is used to generate a rule like the one 100 shown in FIG. 1B. In one example process, the bender receives the cutting rule 130 from a roll and bends the cutting rule 130 in accordance with a shape diagram programmed into the bender. In one example, the cutting rule 130 may then be inserted into the die-board 110. In other examples, the cutting rule 130 may be inserted into the die-board 110 later together with the crease rules 120, 122.

Once the cutting rule 130 has been generated (i.e., bent into a desired shape according to the shape diagram), the configuration of the bender is changed for generating the crease rules 120, 122. To do this, the cutting rule roll is removed and the crease rule roll is attached to the bender. Thus, in one example process, the bender now receives the crease rule from the roll of crease rule and cuts or snips the crease rule into different sizes. For example, the length of the crease rules 120 may be different from the length of the crease rules 122 in FIG. 1B.

However, changing the configuration of the bender is a cumbersome process of re-programming the bender and switching out the heavy roll of cutting rule with the heavy roll of crease rule (the rolls are heavy because they are made of metallic material). There may be other changes that need to be made to change the configuration. Further, the use of the bender to cut or snip the crease rule takes the bender out of service for other bending purposes.

It is common in the preparation of the rule for the die-board to use the bender for generating both the cutting rule and the crease rule. That is, the bender uses the cutting rule(s) (to be bent into a particular shape) to outline the outer boundaries (e.g., bold line 130 in FIG. 1B), while the bender uses the straight crease rule(s) (to be measured and cut) for the folding of the interior lines (e.g., dotted lines 120, 122 in FIG. 1B). Accordingly, a separate cutting system (for cutting crease rules), which can be added to a bending system (for bending cutting rules), is desired.

Figure 2A:
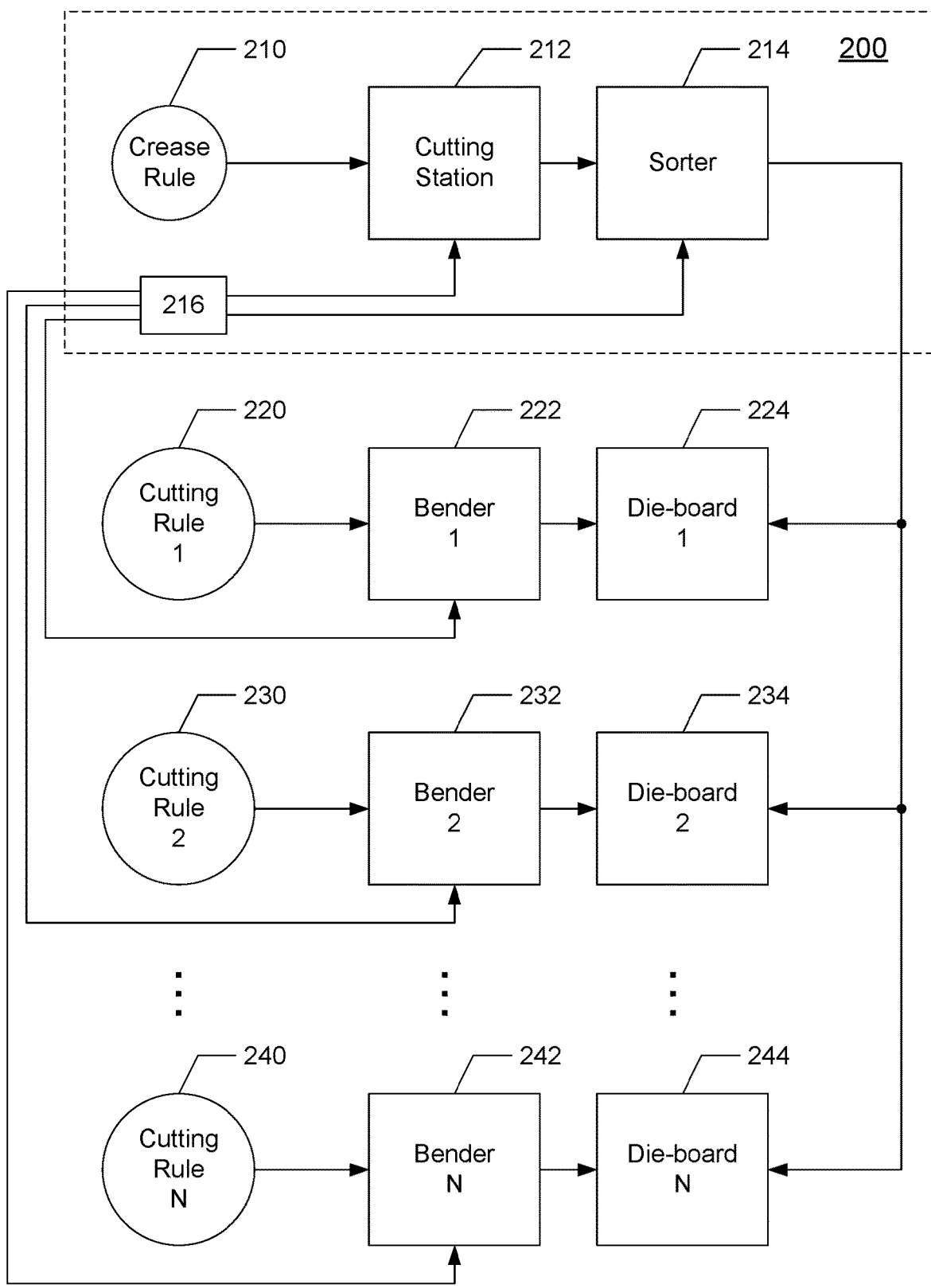
FIG. 2A is a block diagram of a cutting system in accordance with one implementation of the present disclosure.

FIG. 2A is a block diagram of a cutting system 200 in accordance with one implementation of the present disclosure. In FIG. 2A, the cutting system 200 is used in conjunction with a set of benders 222, 232, 242. The cutting system 200 includes a cutting station 212, a sorter 214, and a controller 216.

In the illustrated implementation of FIG. 2A, the controller 216 generates a shape diagram for each of a plurality of benders 222, 232, 242, which receives the cutting rules 220, 230, 240, respectively. Thus, each bender 222, 232, or 242 is programmed to bend the cutting rule 220, 230, or 240 according the shape diagram generated by the controller 216 and to output the bent cutting rule to each of a plurality of die-boards 224, 234, 244. For example, the bender 222, 232, or 242 outputs the bent cutting rule 220, 230, or 240 in a shape 130 shown in FIG. 1B.

In the illustrated implementation of FIG. 2A, the controller 216 also determines the crease or perforation rules that need to be generated for the shape diagram (for each bender) and sends the number and measurement of the crease or perforation rules to the cutting station 212. The cutting station 212 receives the crease or perforation rule 210 and cuts the crease or perforation rule 210 into the appropriate number and measurement. A perforation rule may be configured as combined crease-cutting rules. In the example shown in FIG. 1B, the cutting station 212 would cut and output four 'long-segment' crease rules 122 and five 'short-segment' crease rules 120.

If only one bender is used, the operation would involve outputting and inserting the bent cutting rule (e.g., rule 130 in FIG. 1B) from the bender (e.g. bender 222) and the crease rules (e.g., rules 120, 122) from the cutting station 212 into the die-board (e.g., die-board 224). However, when multiple benders with multiple shape diagrams are involved, the controller 216 also controls the sorter 214 to direct the output of the cutting station 212 to the appropriate die-board 224, 234, or 244.

Figure 2B:
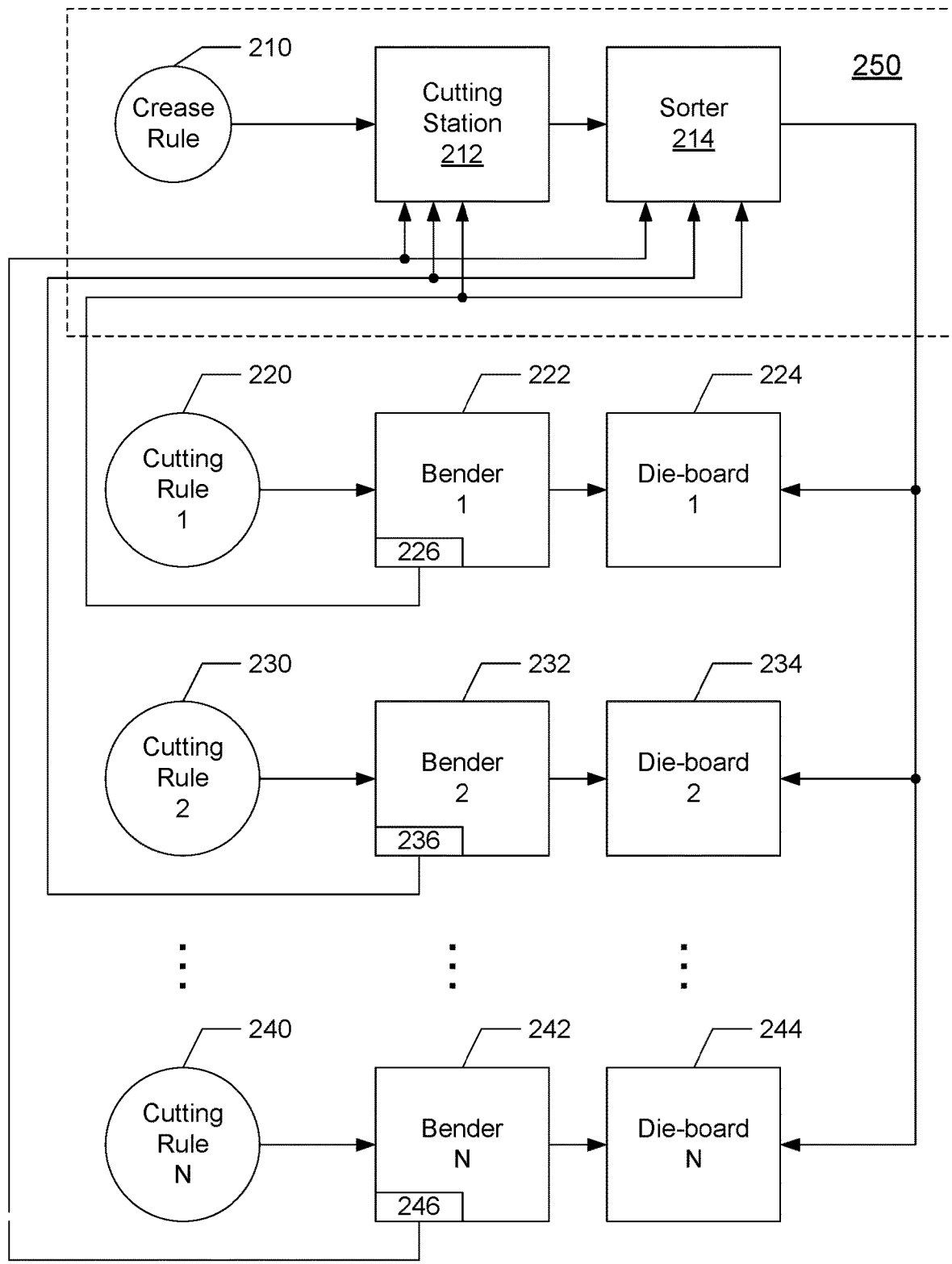
FIG. 2B is a block diagram of a cutting system in accordance with another implementation of the present disclosure.

In an alternative implementation of the cutting system 250 shown in FIG. 2B, the cutting station 212 and the sorter 214 receives the shape diagrams 226, 236, 246 and instructions from the plurality of benders 222, 232, 242.

Figure 3:
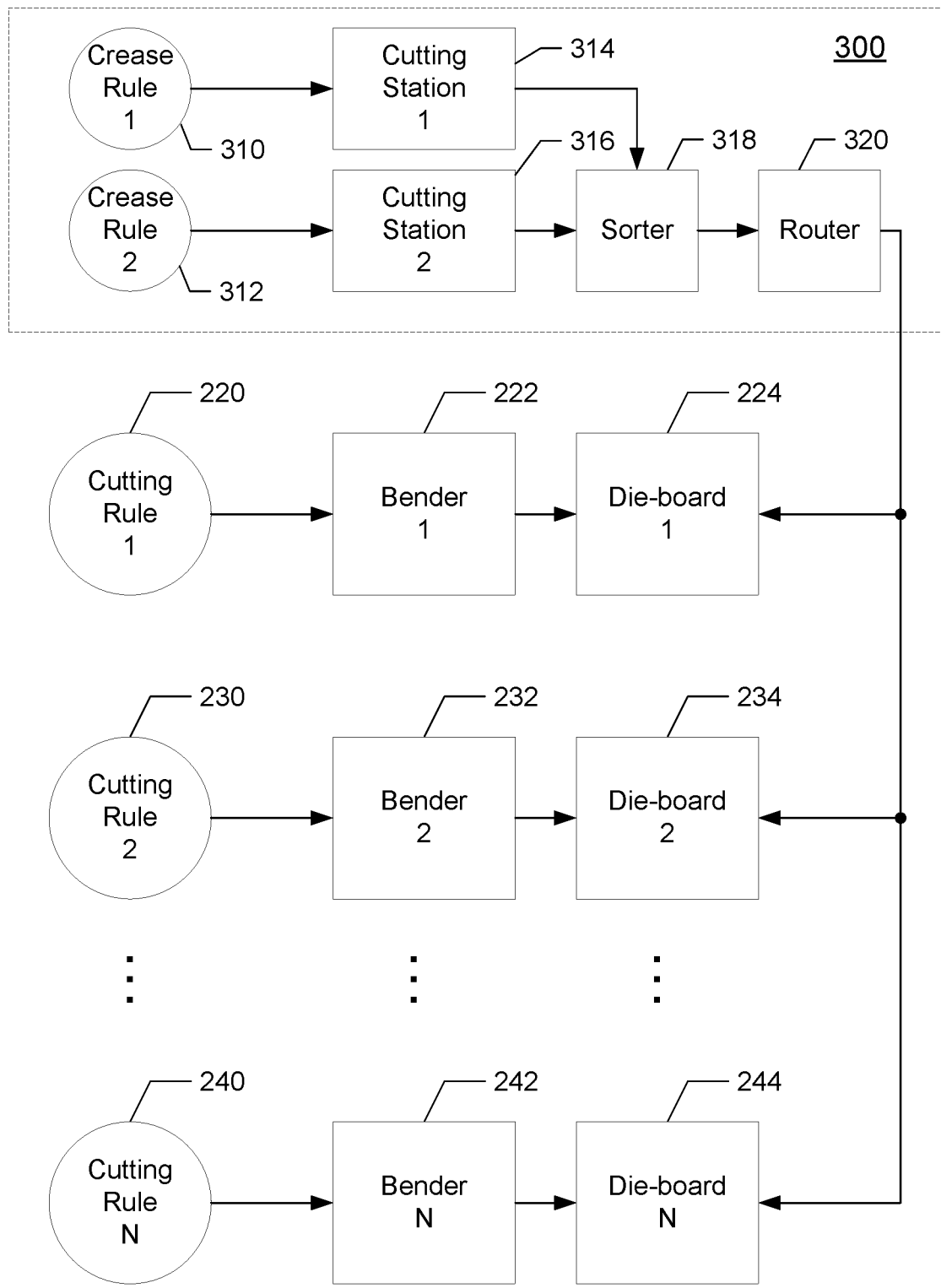
FIG. 3 is a block diagram of a cutting system in accordance with yet another implementation of the present disclosure.

FIG. 3 is a block diagram of a cutting system 300 in accordance with another implementation of the present disclosure. In FIG. 3, the cutting system 300 includes two cutting stations 314, 316 (in other implementations, more than two cutting stations may be used). In this implementation, the two cutting stations 314, 316 may be configured differently to handle the crease rules 310, 312 of different material, thickness, etc. In other implementations, the two cutting stations 314, 316 may be configured such that one cutting station 314 is configured to cut the crease rule, while the other cutting station 316 is configured to cut the cutting rule. The sorter 318 sorts the crease rules generated by the two cutting stations 314, 316 and the router 320 routes them to the proper die-boards. In still other implementations, the cutting system 300 may be configured with two sorters to handle the two cutting stations 314, 316.

In one implementation, a system for generating rules inserted into at least one pattern board is disclosed. The system includes: a controller configured to generate at least one shape diagram, the controller also configured to determine number and measurement of crease rules to be generated based on the at least one shape diagram; a cutting station configured to receive and cut a first crease rule into the number and measurement of the crease rules; and a sorter configured to receive the crease rules from the cutting station and sort the crease rules according to the measurement of the crease rules, wherein the sorted crease rules are inserted into each of the at least one pattern board along with a cutting rule shaped by each of at least one bender.

In one implementation, the crease rules include at least one press rule for pressing on a plate matter and at least one perforation rule for making perforations on the plate matter.

In one implementation, the measurement of the crease rules includes a length. In one implementation, the sorter sorts the crease rules according to the length of the crease rules. In another implementation, the measurement of the crease rules includes a depth.

In one implementation, the first crease rule is configured as a spool of rule. In another implementation, the first crease rule is configured as a strip of rule.

In one implementation, the controller sends each of the at least one shape diagram to each of the at least one bender to bend the cutting rule.

In one implementation, the system includes: a cutting station configured to receive a plurality of shape diagrams from a plurality of benders, the cutting station also configured to determine number and measurement of a plurality of crease rules to be generated for each of the plurality of shape diagrams, the cutting station further configured to cut a first crease rule into the number and measurement of the plurality of crease rules; and a sorter configured to receive the plurality of crease rules from the cutting station and sort the plurality of crease rules according to the measurement of the crease rules for each of the plurality of pattern boards, wherein the sorted crease rules are inserted into each of the plurality of pattern boards along with a cutting rule shaped by each of the plurality of benders.

In one implementation, the cutting station receives one of the plurality of shape diagrams from each of the plurality of benders.

In one implementation, the measurement of the plurality of crease rules includes a length.

In one implementation, the sorter sorts the plurality of crease rules according to the length of the crease rules.

In one implementation, the system includes: a plurality of cutting stations configured to generate a shape diagram and determine number and measurement of a plurality of crease rules to be generated for the shape diagram, a first cutting station of the plurality of cutting stations is configured to cut at least one of the plurality of crease rules according to a first type of measurement of the plurality of crease rules, a second cutting station of the plurality of cutting stations is configured to cut at least one of the plurality of crease rules according to a second type of measurement of the plurality of crease rules; and at least one sorter configured to receive the plurality of crease rules from the plurality of cutting stations, the at least one sorter configured to sort the plurality of crease rules according to both the first type and the second type of the measurement of the plurality of crease rules for each of the plurality of pattern boards, wherein the sorted crease rules are inserted into each of the plurality of pattern boards along with a cutting rule shaped by each of a plurality of benders.

In one implementation, the first type of measurement of the plurality of crease rules includes one of type of material, length, thickness, and depth of the plurality of crease rules.

In one implementation, the second type of measurement of the plurality of crease rules includes one of type of material, length, thickness, and depth of the plurality of crease rules that is different than the first type of measurement.

In one implementation, the system further includes a router configured to route the sorted crease rules to a proper one of the plurality of pattern boards.

The above descriptions of the disclosed implementations are provided to enable any person skilled in the art to make or use the disclosure. Various modifications to these implementations will be readily apparent to those skilled in the art, and the generic principles described herein can be applied to other implementations without departing from the spirit or scope of the disclosure. For example, although the examples show two cutting stations and one sorter, any number of cutting stations and sorters can be used. Thus, it will be understood that the description and drawings presented herein represent implementations of the disclosure and are therefore representative of the subject matter which is broadly contemplated by the present disclosure. It will be further understood that the scope of the present disclosure fully encompasses other implementations that may become obvious to those skilled in the art and that the scope of the present disclosure is accordingly limited by nothing other than the appended claims.

Accordingly, the foregoing implementations are merely presented as examples and are not to be construed as limiting the present disclosure. The present teachings can be readily applied to other types of apparatus and/or devices. The description of the present disclosure is intended to be illustrative, and not to limit the scope of the claims. Many alternatives, modifications, and variations will be apparent to those skilled in the art.

What is claimed is:

1. A system for generating rules inserted into at least one pattern board, the system comprising:
   a controller configured to generate at least one shape diagram, the controller also configured to determine a number and measurement of crease rules to be generated based on the at least one shape diagram;
   a cutting station configured to receive and cut a first crease rule into the number and measurement of the crease rules; and
   a sorter configured to receive the crease rules from the cutting station and sort the crease rules according to the measurement of the crease rules, and caused by the controller to direct the crease rules to the at least one pattern board,
   at least one bender, each at least one bender configured to shape a respective cutting rule;
   wherein a cutting rule shaped by the at least one bender is output by the at least one bender to the at least one pattern board and is inserted therein, and wherein the sorted crease rules are inserted into the at least one pattern board.

2. The system of claim 1, wherein the crease rules include at least one press rule for pressing on a plate matter and at least one perforation rule for making perforations on the plate matter.

3. The system of claim 1, wherein the measurement of the crease rules includes a length.

4. The system of claim 3, wherein the sorter sorts the crease rules according to the length of the crease rules.

5. The system of claim 1, wherein the measurement of the crease rules includes a depth.

6. The system of claim 1, wherein the first crease rule is configured as a strip of rule.

7. The system of claim 1, wherein the controller sends the at least one shape diagram to the at least one bender to bend the cutting rule.

* * * * *